United States Patent
Koch

(10) Patent No.: US 7,656,107 B2
(45) Date of Patent: Feb. 2, 2010

(54) CONTROL CIRCUIT FOR AN ARRANGEMENT HAVING AT LEAST TWO DIRECT CURRENT MOTORS THAT ARE CONNECTABLE IN PARALLEL TO A DIRECT VOLTAGE SYSTEM

(75) Inventor: Stefan Koch, Kappelrodeck (DE)

(73) Assignee: Robert Bosch GmbH, Stuttgart (DE)

( * ) Notice: Subject to any disclaimer, the term of this patent is extended or adjusted under 35 U.S.C. 154(b) by 23 days.

(21) Appl. No.: 11/908,583

(22) PCT Filed: Jun. 26, 2006

(86) PCT No.: PCT/EP2006/063544

§ 371 (c)(1),
(2), (4) Date: Sep. 13, 2007

(87) PCT Pub. No.: WO2007/012530

PCT Pub. Date: Feb. 1, 2007

(65) Prior Publication Data

US 2008/0191647 A1    Aug. 14, 2008

(30) Foreign Application Priority Data

Jul. 28, 2005 (DE) .................... 10 2005 035 418

(51) Int. Cl.
*H02P 1/54* (2006.01)
(52) U.S. Cl. .............................. 318/51; 318/66; 318/49
(58) Field of Classification Search .............. 318/51, 318/66, 49, 34, 112
See application file for complete search history.

(56) References Cited

U.S. PATENT DOCUMENTS

| 1,768,760 | A | | 7/1930 | Harvey |
| 5,586,867 | A | * | 12/1996 | Mehlos .................. 417/45 |
| 5,723,958 | A | | 3/1998 | Boll et al. |
| 6,891,342 | B2 | | 5/2005 | Nakamura et al. |

FOREIGN PATENT DOCUMENTS

| DE | 43 29 919 | 3/1995 |
| DE | 103 36 512 | 3/2004 |
| DE | 103 44 301 | 4/2005 |

\* cited by examiner

Primary Examiner—Karen Masih
(74) Attorney, Agent, or Firm—Michael J. Striker

(57) ABSTRACT

The invention relates to a control circuit for an arrangement having at least two DC motors (10, 12), which can be connected in parallel to a DC voltage system (16, 18), in particular a circuit for controlling at least two motors of a motor vehicle fan. In this case, the DC motors (10, 12) can be connected to the DC voltage system (16, 18), on the one hand, during starting, jointly via in each case one series resistor (22, 24) having a low resistance value and a common semiconductor switching element (26) and, on the other hand, during operation, via separate semiconductor switching elements (32, 34), the series circuit comprising the separate series resistors (22, 24) and the common semiconductor switching element (26) being arranged in parallel with the separate semiconductor switching elements (30, 32) for controlling the motors during operation.

15 Claims, 1 Drawing Sheet

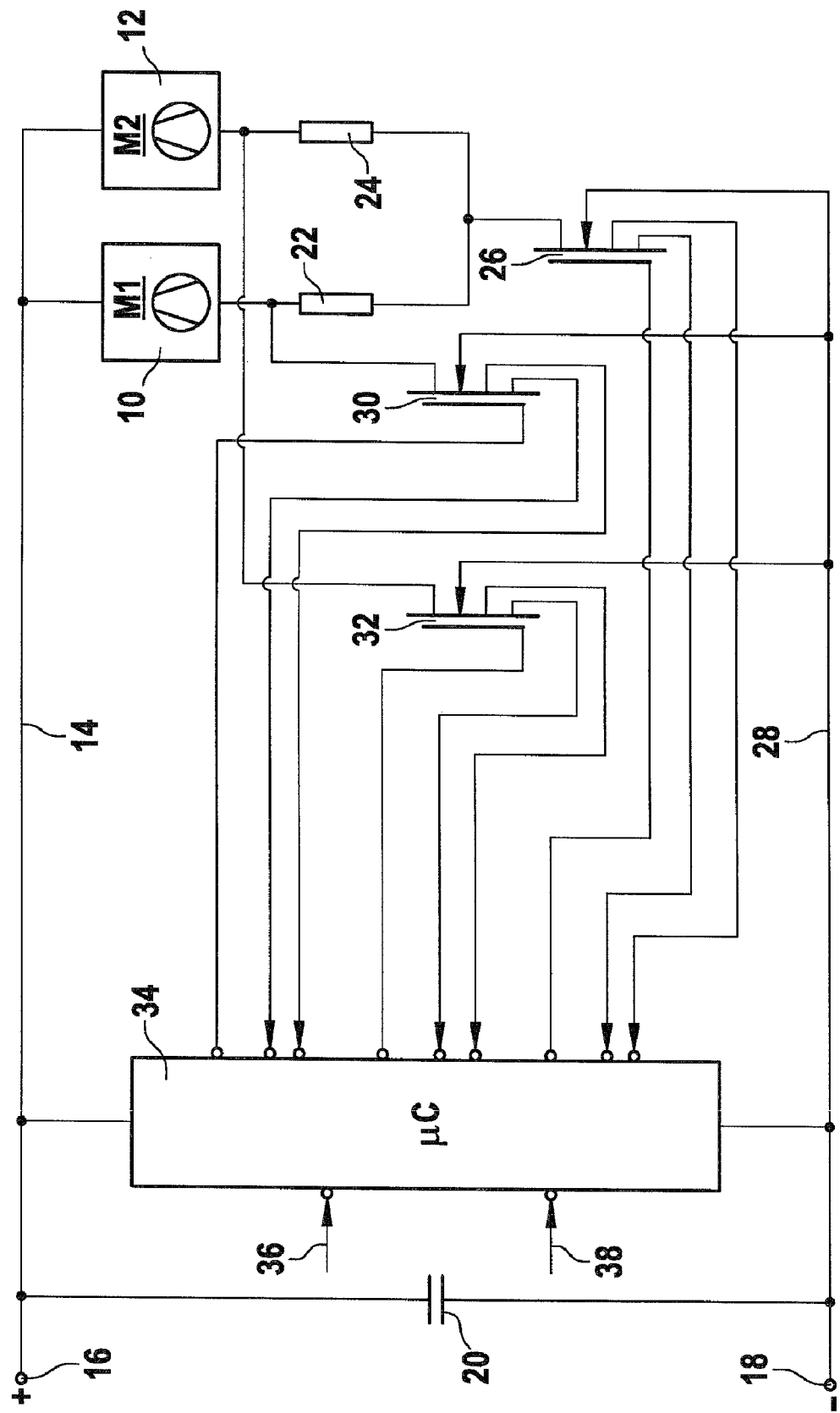

CONTROL CIRCUIT FOR AN ARRANGEMENT HAVING AT LEAST TWO DIRECT CURRENT MOTORS THAT ARE CONNECTABLE IN PARALLEL TO A DIRECT VOLTAGE SYSTEM

CROSS REFERENCE TO RELATED APPLICATION

The invention described and claimed hereinbelow is also described in German Patent Application DE 10 2005 035 418.1 filed on Jul. 18, 2005. This German Patent Application, whose subject matter is incorporated here by reference, provides the basis for a claim of priority of invention under 35 U.S.C. 119(a)-(d).

BACKGROUND OF THE INVENTION

The invention is based on a control circuit for an arrangement having at least two direct current motors that can be connected in parallel to a direct voltage system, in particular a circuit for controlling at least two fan motors of a motor vehicle, of the kind used in known circuit arrangements of fan power controllers in motor vehicles. Controlling such motors is done by pulse width modulation of the supply voltage, at a clock frequency typically of approximately 20 kHz; the pulse width ratio determines the motor terminal voltage. The power of the motor, or its torque and rpm, are thus adjusted. The direct current motors here are connected in series with associated power circuit elements between the positive and negative poles of the direct voltage system; one free-wheeling circuit each with a power diode and a common connection back to the positive pole of the direct voltage system via a choke and a further power circuit element is associated with each of the motors. This further power circuit element in the free-wheeling circuit then simultaneously serves to protect against mispolarization for the circuit arrangement and in the event of mispolarization is switched to high impedance.

From German Patent Disclosure DE 103 44 301 A, a control circuit for triggering a single inductive electrical consumer is also known; it has first and second circuit elements, and the first circuit element is connected in series with a resistor element and the consumer between the connection terminals of a direct voltage system. Also here, a second power circuit element is located parallel to the series circuit comprising the resistor element and the first circuit element, and this second power circuit element is controllable by pulse width modulation to adjust the power of the consumer in operation. However, this known control circuit does not disclose any power control for parallel-connected electric motors, nor does it provide any information about possible circuitry for free-wheeling of the motor and for preventing damage from mispolarization upon connection to the direct voltage system. Moreover, the measures taken to detect the motor current are relatively complex and expensive.

SUMMARY OF INVENTION

Accordingly, it is an object of the present invention to provide a control circuit for an arrangement having at least two direct current motors that can be connected in parallel to a direct voltage system, which control circuit makes safe, reliable operation of the parallel-connected motors possible while using the smallest possible number of components.

The object is attained by a control circuit for an arrangement having at least two direct current motors that are connectable in parallel to a direct voltage system, in particular for controlling at least two fan motors of a motor vehicle blower, wherein the direct current motors are connectable jointly to the direct voltage system on the one hand upon starting, each via a respective low-resistance protective resistor and one common semiconductor circuit element, and on the other, in operation, are connectable via separate semiconductor circuit elements, and the series circuit of the separate protective resistors and the common semiconductor circuit element is located parallel to the separate semiconductor circuit elements for controlling the motor in operation.

In this respect, it has proved advantageous if in a fundamentally known way the semiconductor circuit elements and protective resistors are each located between the direct current motor and the negative pole of the direct voltage system, since in that case the required control voltages for the semiconductor circuit elements can be at a lower level than the supply voltage of the direct voltage system, thus reducing the expense of constructing the triggering for the semiconductor circuit elements. It is especially advantageous if at least individual semiconductor circuit elements are embodied as sense FETs, because such semiconductor circuit elements can be used directly for measuring the current in the line system, without requiring further complicated circuitry provisions. Moreover, the circuit arrangement of the invention makes it possible to dispense with further components for the free-wheeling mode of the direct current motors.

The semiconductor circuit elements in the control circuit of the invention are advantageously triggered by a microcontroller, since thus the various control provisions can be combined in one trigger circuit. In particular, this makes especially simple, inexpensive monitoring of the polarity of the direct voltage system connected possible, because the microcontroller is supplied not only with a set-point value for triggering the semiconductor circuit elements but also with a test signal for the polarity of the direct voltage connected. As a result, without additional circuit elements, it is attained that the triggering of the semiconductor circuit elements is enabled only if the microcontroller has detected the correct polarization of the connected direct voltage.

Further details and advantageous features of the invention will become apparent from the description of the exemplary embodiment.

BRIEF DESCRIPTION OF THE DRAWINGS

FIG. 1 of the drawings is a view showing a control circuit for two direct current motors connected in parallel to a direct voltage system, each of which motors is coupled with a respective fan.

DECRIPTION OF THE PREFERRED EMBODIMENTS

In the drawing, 10 designates a first direct current motor and 12 a second direct current motor, which are connected in parallel, via line 14, to the positive pole 16 of a direct voltage system. The negative pole of the direct voltage system is marked 18; to improve the electromagnetic compatibility, an intermediate circuit capacitor 20 is connected between the positive pole 16 and the negative pole 18.

The direct current motors 10 and 12 are each coupled to a respective fan, indicated by a symbol in the drawing, and are preferably intended for use in a cooling blower of a motor vehicle. Providing two separate motors upon installation in the engine compartment of a motor vehicle affords the possibility of reducing the structure height in the region of the hood of the vehicle, so that the engineer has greater freedom in designing the front of the vehicle. Moreover, the use of two smaller blower units instead of one large unit affords better options for guiding and measuring the cooling air and thus affords better utilization of the fan power for cooling the vehicle engine. Corresponding considerations also apply to the use of two smaller motors, instead of one large motor, for instance for use in the air conditioner blower of a motor vehicle.

The direct current motors 10 and 12 are each connected via a respective low-impedance heavy-duty resistor 22 and 24, and via a common semiconductor circuit element 26 in the form of a sense FET, to a ground line 28 and by way of it to the negative pole 18 of the direct voltage system. Moreover, each connection toward ground of the direct current motors 10 and 12 is connected via separate semiconductor circuit elements 30 and 32 and via the ground line 28 to the negative pole 18 of the direct voltage system, and for these semiconductor circuit elements as well, sense FETs are used. The drain electrode of each of the sense FETs is connected to a respective ground connection of the electric motors 10 and 12, and the source electrodes are connected to the ground line 28.

For controlling the semiconductor circuit elements 26, 30 and 32, their gate electrodes are connected to associated control outputs of a microcontroller 34. The measuring electrodes of the sense FETs 26, 30 and 32 furnish the microcontroller 34 with the information about the magnitude of the current flowing in the applicable circuit branch. For supplying voltage, the microcontroller 34 is connected to the positive line 14 and to the ground line 28 of the direct voltage system; at two further inputs, it receives a set-point value 36 for controlling the motor currents and a test signal 28 for monitoring the correct polarization of the direct voltage system upon connection of the control circuit to it.

The control circuit functions as follows:

Depending on the set-point value 36 applied, the microcontroller 34 furnishes control signals to the semiconductor circuit elements for the direct current motors 10 and 12, on the condition that the test signal 38 indicates the correct polarization of the direct voltage at the poles 16 and 18. In the startup phase, the first sense FET 26 receives a permanent activation signal at its gate electrode from the microcontroller 34. The sense FET 26 becomes conductive and connects the outputs of the direct current motors 10 and 12 simultaneous and in common via the respective protective resistors 22 and 24 and its drain and source electrodes to the negative pole 18 of the direct voltage system. The sum of the currents flowing via the motors 10 and 12 is detected at the evaluation electrodes of the sense FET 26 and furnished to the microcontroller 34, which once a predetermined startup total current is reached furnishes pulsed activation signals via the motors 10 and 12 to the gate electrodes of the second sense MOSFET 30 and third sense MOSFET 32. Depending on the duty cycle of these control signals, the direct current motor 10, via the second FET 30, and the direct current motor 12, via the third FET 32, are connected directly to the ground line 28, bypassing the protective resistors 22 and 24. The sense electrodes of the sense FETs 30 and 32 furnish separate measured values for the motor currents to the microcontroller 34. The first sense FET 26 remains constantly conductive, while the sense FETs 30 and 32 are clocked at a frequency above 15 kHz, and preferably at a frequency of 20 kHz.

Since in use in motor vehicles the direct current motors 10 and 12 are used essentially to lessen the structural size, compared to a correspondingly larger single motor, they are activated simultaneously, via a common semiconductor circuit element 26 in the form of the first sense FET. The motors 10 and 12 can then be of equal size, or depending on the cooling air flows required, they may output different power levels. The same is correspondingly true for the protective resistors 22 and 24; optionally, a smaller protective resistor is associated with the motor having the higher power, to reduce the total power loss. Providing exactly the same power levels of the motors 10 and 12 is avoided, to suppress resonances, caused by frequency fluctuations, that do not occur when the rotary speeds are different.

At a typical power level of 500 W for this kind of direct current motor for a cooling air blower, the power loss at the protective resistor 22 or 24 upon startup of the motors is on the order of magnitude of 100 W; the motor itself on startup has a power input on the order of magnitude of 200 W. In operation, the power loss at the protective resistors 22 and 24, with an increasing duty cycle of the PWM triggering of the semiconductor circuit elements 30 and 32, and becomes virtually zero once the semiconductor switches are made fully conducting. At the same time, the power input of the motor rises from the starting power of approximately 200 W to the full motor power of 500 W, in this example of use.

The control circuit of the invention makes it possible, at little expense for componentry, to control the operation of two or optionally more parallel-connected direct current motors in a direct voltage system. In the startup phase of the motors, only one common circuit element is needed, which in addition replaces the otherwise usual components in the individual free-wheeling circuits of the motors, since it remains constantly on in operation and thus can take on the free-wheeling current. Free-wheeling diodes, free-wheeling chokes, and optionally electrolyte capacitors, that are otherwise needed can be omitted. The protective resistors 22 and 24 are dimensioned such that the direct current motors 10 and 12, in the startup range, reach approximately 20% to 50% of their rated rpm.

The rotary speeds of the direct current motors 10 and 12 in the circuit arrangement of the invention can be adjusted in different ways. Depending on the choice of different motors, their rpm in the startup mode is determined by the size of the protective resistor 22 and 24, respectively. In the triggering of the motors via the semiconductor circuit elements 30 and 32, it is furthermore possible, by means of different duty cycles of the pulse width modulation, to choose different rotary speeds for the two motors. In this case, the protective resistor is bridged with low impedance by the associated semiconductor switch. The second, or each further, direct current motor can then be triggered with an individually selectable duty cycle, either still via a protective resistor, or directly via the associated semiconductor switch.

Besides economy in terms of components for the free-wheeling mode and/or in the event of mispolarization, the control circuit of the invention, when sense FETs are used as the semiconductor circuit elements 26, 30, and/or 32, also makes it possible to detect the current flowing in the applicable line branch, and thus to monitor any blockage or sluggishness that may occur in a given motor. This provision likewise makes it possible to reduce the circuitry construction further to a marked extent. Optionally, for high motor currents, parallel-connected semiconductor circuit elements are used. If on the other hand the sense FETs for the semiconductor circuit elements 26, 30 and/or 32 is to be dispensed with, then in the startup mode, the voltage drop at the protective resistors 22 and 24 can also be measured and evaluated for determining the motor currents. It is also possible, when normal MOSFETs are used for the semiconductor circuit elements 30 and 32, to measure current and in particular detect blockage in such a way that at full load and at 100% rpm of the motors, the semiconductor circuit element 30 and/or 32 is briefly opened and the motor current flowing via the protective resistor is measured, either at the sense electrodes of the first sense FET 26 or at the associated protective resistor 22 or 24.

Overall, the circuit can be embodied as a so-called high-side circuit or as a low-side circuit. Functionally, the two circuits are equivalent. The low-side circuit offers the advantage that for triggering the semiconductor circuit elements 26, 30 and 32, increased control voltages are not needed; the high-side circuit has the advantage that the voltage of the direct voltage system is not applied constantly to the connections, remote from the positive pole 16 of the system, of the direct current motors 10 and 12, or at the connection point downstream of the protective resistors 22 and 24.

The invention claimed is:

1. A control circuit for an arrangement having at least two direct current motors that are connectable in parallel to a direct voltage system, in particular for controlling at least two fan motors of a motor vehicle blower, wherein the direct current motors (10, 12) are connectable jointly to the direct voltage system (16, 18) on the one hand upon starting, each via a respective low-resistance protective resistor (22, 24) and one common semiconductor circuit element (26), and on the other, in operation, are connectable via separate semiconductor circuit elements (30, 32), and the series circuit of the separate protective resistors (22, 24) and the common semiconductor circuit element (26) is located parallel to the separate semiconductor circuit elements (30, 32) for controlling the motor in operation, and the at least two direct current motors (10, 12) with different capacities are connectable to the direct voltage system (16, 18) via different-sized protective resistors (22, 24), and the smaller protective resistor is connected in series with the direct current motor having the greater capacity.

2. The control circuit as defined by claim 1, wherein the protective resistors (22, 24) and the semiconductor circuit elements (26, 30, 32) are each located (low-side circuit) between the direct current motors (10, 12) and the negative pole (18) of the direct voltage system (16, 18).

3. The control circuit as defined by claim 1, wherein the protective resistors (22, 24) are dimensioned such that the direct current motors (10, 12), in the startup mode, reach rotary speeds of 20% to 50% of the rated speeds.

4. The control circuit as defined by claim 1, wherein the semiconductor circuit element (26) that is in series with the protective resistors (22, 24) is constantly ON in operation, while the semiconductor circuit elements (30, 32) that connect the motors (10, 12) directly to the direct voltage system (16, 18) are clocked at a frequency above 15 kHz.

5. The control circuit as defined by claim 1, wherein the rotary speeds of the motors (10, 12) are adjustable independently of one another via the separate semiconductor circuit elements (30, 32) by means of different duty cycles of the pulse width modulation.

6. A control circuit for an arrangement having at least two direct current motors that are connectable in parallel to a direct voltage system, in particular for controlling at least two fan motors of a motor vehicle blower, wherein the direct current motors (10, 12) are connectable jointly to the direct voltage system (16, 18) on the one hand upon starting, each via a respective low-resistance protective resistor (22, 24) and one common semiconductor circuit element (26), and on the other, in operation, are connectable via separate semiconductor circuit elements (30, 32), and the series circuit of the separate protective resistors (22, 24) and the common semiconductor circuit element (26) is located parallel to the separate semiconductor circuit elements (30, 32) for controlling the motor in operation, and at least individual semiconductor circuit elements (26, 30, 32) are embodied as sense FETs.

7. The control circuit as defined by claim 6, wherein the protective resistors (22, 24) and the semiconductor circuit elements (26, 30, 32) are each located (low-side circuit) between the direct current motors (10, 12) and the negative pole (18) of the direct voltage system (16, 18).

8. The control circuit as defined by claim 6, wherein the protective resistors (22, 24) are dimensioned such that the direct current motors (10, 12), in the startup mode, reach rotary speeds of 20% to 50% of the rated speeds.

9. The control circuit as defined by claim 6, wherein the semiconductor circuit element (26) that is in series with the protective resistors (22, 24) is constantly ON in operation, while the semiconductor circuit elements (30, 32) that connect the motors (10, 12) directly to the direct voltage system (16, 18) are clocked at a frequency above 15 kHz.

10. The control circuit as defined by claim 6, wherein the rotary speeds of the motors (10, 12) are adjustable independently of one another via the separate semiconductor circuit elements (30, 32) by means of different duty cycles of the pulse width modulation.

11. A control circuit for an arrangement having at least two direct current motors that are connectable in parallel to a direct voltage system, in particular for controlling at least two fan motors of a motor vehicle blower, wherein the direct current motors (10, 12) are connectable jointly to the direct voltage system (16, 18) on the one hand upon starting, each via a respective low-resistance protective resistor (22, 24) and one common semiconductor circuit element (26), and on the other, in operation, are connectable via separate semiconductor circuit elements (30, 32), and the series circuit of the separate protective resistors (22, 24) and the common semiconductor circuit element (26) is located parallel to the separate semiconductor circuit elements (30, 32) for controlling the motor in operation, wherein the semiconductor circuit elements (26, 30, 32) are controlled by a microcontroller (34), and the microcontroller (34) is supplied not only with the set-point value (36) for controlling the semiconductor circuit elements but also a test signal (38) for the polarization of the connected direct voltage system (16, 18).

12. The control circuit as defined by claim 11, wherein the protective resistors (22, 24) and the semiconductor circuit elements (26, 30, 32) are each located (low-side circuit) between the direct current motors (10, 12) and the negative pole (18) of the direct voltage system (16, 18).

13. The control circuit as defined by claim 11, wherein the protective resistors (22, 24) are dimensioned such that the direct current motors (10, 12), in the startup mode, reach rotary speeds of 20% to 50% of the rated speeds.

14. The control circuit as defined by claim 11, wherein the semiconductor circuit element (26) that is in series with the protective resistors (22, 24) is constantly ON in operation, while the semiconductor circuit elements (30, 32) that connect the motors (10, 12) directly to the direct voltage system (16,18) are clocked at a frequency above 15 kHz.

15. The control circuit as defined by claim 11, wherein the rotary speeds of the motors (10, 12) are adjustable independently of one another via the separate semiconductor circuit elements (30, 32) by means of different duty cycles of the pulse width modulation.

* * * * *